United States Patent
Hassan et al.

(10) Patent No.: US 9,705,637 B2
(45) Date of Patent: Jul. 11, 2017

(54) GUARD BAND UTILIZATION FOR WIRELESS DATA COMMUNICATION

(71) Applicant: Microsoft Technology Licensing, LLC, Redmond, WA (US)

(72) Inventors: Amer A. Hassan, Kirkland, WA (US); Paul W. Garnett, Albany, NY (US); Paul William Alexander Mitchell, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/462,820

(22) Filed: Aug. 19, 2014

(65) Prior Publication Data
US 2016/0056916 A1    Feb. 25, 2016

(51) Int. Cl.
| | |
|---|---|
| *H04W 4/00* | (2009.01) |
| *H04L 1/00* | (2006.01) |
| *H04L 27/26* | (2006.01) |
| *H04L 12/26* | (2006.01) |
| *H04W 16/14* | (2009.01) |
| *H04W 72/08* | (2009.01) |

(52) U.S. Cl.
CPC .......... *H04L 1/003* (2013.01); *H04L 27/2607* (2013.01); *H04L 43/08* (2013.01); *H04W 16/14* (2013.01); *H04W 72/082* (2013.01)

(58) Field of Classification Search
None
See application file for complete search history.

(56) References Cited

U.S. PATENT DOCUMENTS

| | | | |
|---|---|---|---|
| 5,576,981 | A | 11/1996 | Parker et al. |
| 5,719,898 | A | 2/1998 | Davidovici et al. |
| 5,973,677 | A | 10/1999 | Gibbons |
| 6,266,685 | B1 | 7/2001 | Danielson et al. |
| 6,337,924 | B1 | 1/2002 | Smith |
| 6,442,764 | B1 | 9/2002 | Badillo et al. |
| 6,691,176 | B1 | 2/2004 | Narin et al. |
| 6,918,066 | B2 | 7/2005 | Dutta et al. |

(Continued)

FOREIGN PATENT DOCUMENTS

| | | |
|---|---|---|
| CN | 1825278 | 8/2006 |
| CN | 101388057 | 3/2009 |

(Continued)

OTHER PUBLICATIONS

U.S. Appl. No. 61/981,608, Sadek et al.*

(Continued)

*Primary Examiner* — Kwang B Yao
*Assistant Examiner* — Juvena Loo

(57) ABSTRACT

Techniques for guard band utilization for wireless data communication are described. In at least some embodiments, guard bands can be leveraged to transmit wireless broadband data and/or other forms of wireless data. According to one or more embodiments, signal activity in a wireless channel that is adjacent to a guard band is monitored, e.g., while the guard band is being utilized for wireless data communication. In at least some implementations, if the signal activity exceeds a signal activity threshold, usage of the guard band channel can be adjusted to mitigate interference with signal activity in an adjacent channel.

20 Claims, 10 Drawing Sheets

(56) References Cited

U.S. PATENT DOCUMENTS

| | | | |
|---|---|---|---|
| 7,055,146 B1 | 5/2006 | Durr et al. | |
| 7,151,795 B1 | 12/2006 | Goldburg | |
| 7,437,193 B2 | 10/2008 | Parramon et al. | |
| 7,535,874 B2 | 5/2009 | Ozluturk et al. | |
| 7,623,121 B2 | 11/2009 | Dodge | |
| 7,626,358 B2 | 12/2009 | Lam et al. | |
| 7,639,876 B2 | 12/2009 | Clary et al. | |
| 7,653,893 B2 | 1/2010 | Neumann et al. | |
| 7,681,208 B1 | 3/2010 | Pantuso et al. | |
| 7,853,646 B2 | 12/2010 | Black et al. | |
| 7,921,430 B2 | 4/2011 | Johnson et al. | |
| 7,953,295 B2 | 5/2011 | Vincent et al. | |
| 8,090,225 B2 | 1/2012 | Lapstun et al. | |
| 8,111,988 B1* | 2/2012 | Schantz | H04B 10/0775 398/25 |
| 8,141,059 B2 | 3/2012 | Ding et al. | |
| 8,175,613 B2 | 5/2012 | Patil et al. | |
| 8,363,036 B2 | 1/2013 | Liang | |
| 8,370,629 B1 | 2/2013 | Ngo et al. | |
| 8,401,054 B2 | 3/2013 | Myers et al. | |
| 8,432,939 B2 | 4/2013 | Bhattad et al. | |
| 8,490,084 B1 | 7/2013 | Alford et al. | |
| 8,509,563 B2 | 8/2013 | Robinson et al. | |
| 8,537,851 B1 | 9/2013 | Gossett et al. | |
| 8,606,293 B2 | 12/2013 | Kim et al. | |
| 8,634,386 B2 | 1/2014 | Jagger et al. | |
| 8,634,849 B2 | 1/2014 | Jovicic et al. | |
| 8,639,266 B2 | 1/2014 | Zelinka | |
| 8,643,849 B2 | 2/2014 | Tao et al. | |
| 8,655,944 B2 | 2/2014 | Silbey et al. | |
| 8,700,060 B2 | 4/2014 | Huang | |
| 8,780,232 B2 | 7/2014 | Craig et al. | |
| 9,277,063 B2 | 3/2016 | Kido | |
| 9,397,723 B2 | 7/2016 | Hassan et al. | |
| 9,501,701 B2 | 11/2016 | Walter et al. | |
| 9,513,671 B2 | 12/2016 | Huston et al. | |
| 9,524,429 B2 | 12/2016 | Zhang et al. | |
| 9,558,170 B2 | 1/2017 | Barrus et al. | |
| 2001/0009545 A1 | 7/2001 | Schilling | |
| 2002/0015437 A1 | 2/2002 | Li et al. | |
| 2002/0036253 A1 | 3/2002 | Lake | |
| 2002/0186710 A1 | 12/2002 | Alvesalo et al. | |
| 2002/0187799 A1* | 12/2002 | Haartsen | H04L 1/0009 455/509 |
| 2003/0061283 A1 | 3/2003 | Dutta et al. | |
| 2003/0072467 A1 | 4/2003 | Brundage et al. | |
| 2003/0088716 A1 | 5/2003 | Sanders | |
| 2003/0110296 A1 | 6/2003 | Kirsch et al. | |
| 2003/0126311 A1 | 7/2003 | Kushnirskiy et al. | |
| 2003/0132916 A1 | 7/2003 | Kramer | |
| 2003/0143956 A1* | 7/2003 | Taylor | G07C 9/00103 455/67.11 |
| 2003/0179731 A1 | 9/2003 | Noguchi et al. | |
| 2004/0027387 A1 | 2/2004 | Nason et al. | |
| 2004/0031030 A1 | 2/2004 | Kidder et al. | |
| 2004/0100457 A1 | 5/2004 | Mandle | |
| 2004/0120290 A1 | 6/2004 | Makhijani et al. | |
| 2005/0094604 A1 | 5/2005 | Ozluturk et al. | |
| 2005/0157459 A1 | 7/2005 | Yin et al. | |
| 2005/0240949 A1 | 10/2005 | Liu et al. | |
| 2005/0281321 A1 | 12/2005 | Bergstrom et al. | |
| 2006/0068715 A1* | 3/2006 | Hundal | H04B 17/345 455/67.11 |
| 2006/0081714 A1 | 4/2006 | King et al. | |
| 2006/0189353 A1 | 8/2006 | Fujishima | |
| 2006/0197755 A1 | 9/2006 | Bawany | |
| 2006/0238510 A1 | 10/2006 | Panotopoulos et al. | |
| 2006/0270351 A1* | 11/2006 | Lastinger | H04B 17/382 455/63.1 |
| 2007/0022390 A1 | 1/2007 | Hillis et al. | |
| 2007/0051766 A1 | 3/2007 | Spencer | |
| 2007/0147226 A1 | 6/2007 | Khandekar et al. | |
| 2007/0174846 A1 | 7/2007 | Johnson et al. | |
| 2007/0180441 A1 | 8/2007 | Ding et al. | |
| 2007/0247338 A1 | 10/2007 | Marchetto | |
| 2007/0283048 A1 | 12/2007 | Theimer et al. | |
| 2007/0297323 A1* | 12/2007 | Seki | H04L 5/023 370/208 |
| 2008/0024502 A1 | 1/2008 | Nagahara et al. | |
| 2008/0077855 A1 | 3/2008 | Lev et al. | |
| 2008/0077941 A1 | 3/2008 | Holmes et al. | |
| 2008/0104233 A1 | 5/2008 | Smith et al. | |
| 2008/0104580 A1 | 5/2008 | Wilkinson | |
| 2008/0165754 A1* | 7/2008 | Hu | H04W 72/085 370/342 |
| 2008/0180411 A1 | 7/2008 | Solomon et al. | |
| 2008/0215796 A1 | 9/2008 | Lam et al. | |
| 2008/0232061 A1 | 9/2008 | Wang et al. | |
| 2008/0232309 A1* | 9/2008 | McNew | H04L 12/5693 370/329 |
| 2008/0309636 A1 | 12/2008 | Feng et al. | |
| 2009/0007001 A1 | 1/2009 | Morin et al. | |
| 2009/0102794 A1 | 4/2009 | Lapstun et al. | |
| 2009/0187879 A1 | 7/2009 | Ao et al. | |
| 2009/0189810 A1 | 7/2009 | Murray | |
| 2009/0201850 A1 | 8/2009 | Davis et al. | |
| 2009/0217241 A1 | 8/2009 | Motoyama et al. | |
| 2009/0241020 A1 | 9/2009 | Hsiao | |
| 2009/0250366 A1 | 10/2009 | Esfahani | |
| 2010/0001963 A1 | 1/2010 | Doray et al. | |
| 2010/0021022 A1 | 1/2010 | Pittel et al. | |
| 2010/0075517 A1 | 3/2010 | Ni et al. | |
| 2010/0146488 A1 | 6/2010 | Chen et al. | |
| 2010/0188338 A1 | 7/2010 | Longe | |
| 2010/0231556 A1 | 9/2010 | Mines et al. | |
| 2010/0245221 A1 | 9/2010 | Khan | |
| 2011/0066973 A1 | 3/2011 | Plom et al. | |
| 2011/0083126 A1 | 4/2011 | Bhakta et al. | |
| 2011/0093773 A1 | 4/2011 | Yee | |
| 2011/0164813 A1 | 7/2011 | Enomoto | |
| 2011/0183678 A1 | 7/2011 | Kerpez et al. | |
| 2011/0225490 A1 | 9/2011 | Meunier | |
| 2011/0234502 A1 | 9/2011 | Yun et al. | |
| 2011/0248941 A1 | 10/2011 | Abdo et al. | |
| 2011/0299479 A1* | 12/2011 | Deb | H04W 28/18 370/329 |
| 2012/0071189 A1 | 3/2012 | Mody | |
| 2012/0084345 A1 | 4/2012 | Silbey et al. | |
| 2012/0087078 A1 | 4/2012 | Medica et al. | |
| 2012/0106082 A1 | 5/2012 | Wu et al. | |
| 2012/0108180 A1 | 5/2012 | Shibuya | |
| 2012/0170966 A1 | 7/2012 | Novak, Jr. | |
| 2012/0173226 A1 | 7/2012 | McEvoy et al. | |
| 2012/0174224 A1 | 7/2012 | Thomas et al. | |
| 2012/0180002 A1 | 7/2012 | Campbell et al. | |
| 2012/0189203 A1 | 7/2012 | Lin et al. | |
| 2012/0192155 A1 | 7/2012 | Silbey et al. | |
| 2012/0249300 A1 | 10/2012 | Avital et al. | |
| 2012/0263118 A1 | 10/2012 | Love et al. | |
| 2012/0270537 A1 | 10/2012 | Weng et al. | |
| 2013/0050922 A1 | 2/2013 | Lee et al. | |
| 2013/0076617 A1 | 3/2013 | Csaszar et al. | |
| 2013/0093388 A1 | 4/2013 | Partovi | |
| 2013/0106723 A1 | 5/2013 | Bakken et al. | |
| 2013/0165142 A1 | 6/2013 | Huang | |
| 2013/0179798 A1 | 7/2013 | Korupolu et al. | |
| 2013/0191715 A1 | 7/2013 | Raskovic et al. | |
| 2013/0229386 A1 | 9/2013 | Bathiche et al. | |
| 2013/0242762 A1* | 9/2013 | Bennett | H04W 72/0486 370/252 |
| 2013/0279098 A1 | 10/2013 | Cho | |
| 2013/0288516 A1 | 10/2013 | Chang et al. | |
| 2013/0301200 A1 | 11/2013 | Leung | |
| 2013/0322423 A1 | 12/2013 | Park et al. | |
| 2013/0335330 A1 | 12/2013 | Lane | |
| 2013/0335902 A1 | 12/2013 | Campbell et al. | |
| 2013/0335903 A1 | 12/2013 | Raken | |
| 2013/0342465 A1 | 12/2013 | Bathiche | |
| 2013/0346636 A1 | 12/2013 | Bathiche | |
| 2014/0028635 A1 | 1/2014 | Krah | |
| 2014/0029183 A1 | 1/2014 | Ashcraft et al. | |
| 2014/0036430 A1 | 2/2014 | Wroblewski et al. | |
| 2014/0061406 A1 | 3/2014 | Chevalier et al. | |

(56) References Cited

U.S. PATENT DOCUMENTS

| | | | |
|---|---|---|---|
| 2014/0080501 A1 | 3/2014 | Lee et al. | |
| 2014/0094165 A1* | 4/2014 | Karlsson | H04W 16/14 455/423 |
| 2014/0098485 A1 | 4/2014 | Vahid | |
| 2014/0104279 A1 | 4/2014 | Albrecht | |
| 2014/0117928 A1 | 5/2014 | Liao | |
| 2014/0128091 A1 | 5/2014 | Engström | |
| 2014/0173402 A1 | 6/2014 | Bastide et al. | |
| 2014/0173517 A1 | 6/2014 | Chaudhri | |
| 2014/0187288 A1 | 7/2014 | Correll, Jr. | |
| 2014/0328194 A1 | 11/2014 | Sen et al. | |
| 2014/0341056 A1 | 11/2014 | Carbajal | |
| 2015/0085683 A1* | 3/2015 | Sadek | H04L 43/0894 370/252 |
| 2015/0310043 A1 | 10/2015 | Adelman | |
| 2016/0034001 A1 | 2/2016 | Huston et al. | |
| 2016/0042070 A1 | 2/2016 | Rossi et al. | |
| 2016/0050529 A1 | 2/2016 | Hassan et al. | |
| 2016/0055374 A1 | 2/2016 | Zhang et al. | |
| 2016/0055659 A1 | 2/2016 | Wilson et al. | |
| 2016/0065265 A1 | 3/2016 | Hassan et al. | |
| 2016/0073267 A1 | 3/2016 | Hassan et al. | |
| 2016/0330744 A1 | 11/2016 | Hassan et al. | |
| 2017/0116474 A1 | 4/2017 | Zhang et al. | |

FOREIGN PATENT DOCUMENTS

| | | |
|---|---|---|
| CN | 101650659 | 2/2010 |
| CN | 101685487 | 3/2010 |
| CN | 101799855 | 8/2010 |
| CN | 102855232 | 1/2013 |
| DE | 202011103087 | 8/2011 |
| EP | 0611498 | 8/1994 |
| GB | 2178570 | 2/1987 |
| KR | 20030000579 | 1/2003 |
| NL | 1038411 | 5/2012 |
| WO | WO-0158098 | 8/2001 |
| WO | WO-02069533 | 9/2002 |
| WO | WO-2009139789 | 11/2009 |
| WO | WO 2010011983 | 1/2010 |
| WO | WO 2010048746 | 5/2010 |
| WO | WO-2012171729 | 12/2012 |
| WO | WO-2013010323 | 1/2013 |

OTHER PUBLICATIONS

Bohge, et al., "The Use of Guard Bands to Mitigate Multiple Access Interference in the OFDMA Uplink", In Proceedings of 13th International OFDM-Workshop, Aug. 2008, 5 Pages.

Kang, et al., "An Opportunistic Indoors Positioning Scheme Based on Estimated Positions", In Proceedings: IEEE Symposium on Computers and Communications, Jul. 5, 2009, 7 Pages.

Yucek, et al., "A Survey of Spectrum Sensing Algorithms for Cognitive Radio Applications", In Proceedings: IEEE Communications Surveys & Tutorials, vol. 11 No. 1, Jan. 1, 2009, 15 pages.

"ABBYY FineReader", Available at: http://www.softexia.com/office-tools/abbyy-finereader/, Jul. 11, 2013, 10 pages.

"Cholesteric Liquid Crystal", Retrieved from: <http://en.wikipedia.org/wiki/Cholesteric_liquid_crystal> on Aug. 6, 2012, Jun. 10, 2012, 2 pages.

"Chronoscan", Available at: http://www.chronoscan.org/index.php?lang=en, Jan. 26, 2013, 3 pages.

"Final Office Action", U.S. Appl. No. 12/897,947, Dec. 19, 2012, 8 pages.

"Final Office Action", U.S. Appl. No. 13/010,552, Sep. 26, 2013, 22 pages.

"Final Office Action", U.S. Appl. No. 13/010,552, Oct. 23, 2014, 22 pages.

"Final Office Action", U.S. Appl. No. 13/603,918, Mar. 21, 2014, 14 pages.

"Foreign Office Action", CN Application No. 201210018531.4, Feb. 28, 2015, 12 pages.

"Foreign Office Action", CN Application No. 201210018531.4, Jun. 4, 2014, 16 pages.

"How and Why Would Anyone Validate Their Code", Retrieved from: <http://designreviver.com/articles/how-and-why-would-anyone-validate-their-code/> on Nov. 11, 2010, Aug. 25, 2010, 9 pages.

"HP Code Advisor Version C.02.15 User's Guide", Hewlett-Packard Development Company L.P., Available at <http://docs.hp.com/en/14242/Cadvise_UG.pdf>, Jan. 2010, pp. 1-72.

"i-Interactor electronic pen", Retrieved from: <http://www.alibaba.com/product-gs/331004878/i_Interactor_electronic_pen.html> on Jun. 19, 2012, 2012, 5 pages.

"International Search Report and Written Opinion", Application No. PCT/US2013/044871, Aug. 14, 2013, 12 pages.

"International Search Report and Written Opinion", Application No. PCT/US2015/022349, Jun. 25, 2015, 9 Pages.

"International Search Report and Written Opinion", Application No. PCT/US2013/044873, Nov. 22, 2013, 9 pages.

"International Search Report and Written Opinion", Application No. PCT/US2012/021004, Jul. 30, 2012, 9 pages.

"International Search Report and Written Opinion", Application No. PCT/US2013/045049, Sep. 16, 2013, 9 pages.

"Introducing OmniPage Cloud Service", Available at: http://www.nuance.com/for-business/by-product/omnipage/omnipage-cloud-services/index.htm, Sep. 4, 2012, 3 pages.

"MPC Fly Music Production Controller", AKAI Professional, Retrieved from: <http://www.akaiprompc.com/mpc-fly> on Jul. 9, 2012, 4 pages.

"neXus Charging Cradle", Retrieved from <http://www.gen-xtech.com/neXus.php> on Jul. 28, 2014, Apr. 17, 2012, 2 pages.

"Non-Final Office Action", U.S. Appl. No. 12/897,947, Jun. 7, 2012, 7 pages.

"Non-Final Office Action", U.S. Appl. No. 13/010,552, May 8, 2015, 27 pages.

"Non-Final Office Action", U.S. Appl. No. 13/010,552, Jul. 8, 2014, 22 pages.

"Non-Final Office Action", U.S. Appl. No. 13/010,552, Aug. 12, 2013, 20 pages.

"Non-Final Office Action", U.S. Appl. No. 13/603,918, Dec. 19, 2013, 12 pages.

"Non-Final Office Action", U.S. Appl. No. 14/468,699, May 15, 2015, 6 pages.

"Notice of Allowance", U.S. Appl. No. 12/897,947, Oct. 8, 2013, 8 pages.

"OmniPage Standard 18", Available at: http://ocr-software-review.toptenreviews.com/omnipage-standard-review.html, Oct. 27, 2010, 3 pages.

"Pearl scan solutions", Available at: http://www.pearl-scan.co.uk/document-conversion/OCR-conversion.php, Aug. 21, 2008, 2 pages.

"Rechargeable Stylus Pen", Retrieved from <http://www.e-pens.com/uk/rechargeable-stylus-pen.html> on Jul. 28, 2014, Jul. 5, 2013, 1 pages.

"Reflex LCD Writing Tablets", retrieved from <http://www.kentdisplays.com/products/lcdwritingtablets.html> on Jun. 27, 2012, 3 pages.

"Restriction Requirement", U.S. Appl. No. 13/603,918, Nov. 27, 2013, 8 pages.

"Restriction Requirement", U.S. Appl. No. 12/897,947, May 11, 2012, 7 pages.

"ScanSnap ix500 Scanning into Excel", Retrieved on: Feb. 20, 2014, Available at: http://www.youtube.com/watch?v=PvpH4NAzUjM, 2 pages.

"Scansnap", Available at: http://scanners.fcpa.fujitsu.com/scansnapit/scansnap-ix500.php, Jan. 11, 2013, 4 pages.

"SMART Board™ Interactive Display Frame Pencil Pack", Available at <http://downloads01.smarttech.com/media/sitecore/en/support/product/sbfpd/400series(interactivedisplayframes)/guides/smartboardinteractivedisplayframepencilpackv12mar09.pdf>, 2009, 2 pages.

"Understanding the Compatibility View List", Retrieved From: <http://msdn.microsoft.com/en-us/library/dd567845(v=vs.85).aspx> Jun. 11, 2014, Mar. 2011, 5 Pages.

(56) References Cited

OTHER PUBLICATIONS

"Visual Basic 6.0 Code Advisor", Retrieved from: <http://msdn.microsoft.com/en-us/vbasic/ms789135.aspx> on Nov. 11, 2010, 2006, 2 pages.
"Web Site Maintenance Tools, Software", Retrieved from: <http://websitetips.com/tools/> on Nov. 11, 2010, Nov. 11, 2010, 10 pages.
"Write & Learn Spellboard Advanced", Available at <http://somemanuals.com/VTECH,WRITE%2526LEARN--SPELLBOARD--ADV--71000,JIDFHE.PDF>, 2006, 22 pages.
Bathiche,"Input Device with Interchangeable Surface", U.S. Appl. No. 13/974,749, Aug. 23, 2013, 51 pages.
Chapman,"Review of Cross-Browser Testing Tools", Retrieved From: <http://www.smashingmagazine.com/2011/08/07/a-dozen-cross-browser-testing-tools/> Jun. 9, 2014, Aug. 7, 2011, 13 pages.
Choudhary,"CROSSCHECK: Combining Crawling and Differencing to Better Detect Cross-browser Incompatibilities in Web Applications", In Proceedings: IEEE Fifth International Conference on Software Testing, Verification and Validation, Apr. 17, 2012, 10 Pages.
Choudhary,"Detecting Cross-browser Issues in Web Applications", In Proceedings: The 33rd International Conference on Software Engineering, May 21, 2011, 3 Pages.
Kim,"Chrome Extensions for Web Development", Retrieved from: <http://googlecode.blogspot.com/2010/05/chrome-extensions-for-web-development.html> on Nov. 11, 2010, May 27, 2010, 4 pages.
Kristianto,"Cross Browser Compatibility Check Tools", Retrieved from: <http://www.ivankristianto.com/web-development/designs/cross-browser-compatibility-check-tools/1202/> on Nov. 11, 2010, Jan. 26, 2010, 14 pages.
Lane,"Media Processing Input Device", U.S. Appl. No. 13/655,065, Oct. 18, 2012, 43 pages.
Mesbah,"Automated Cross-Browser Compatibility Testing", In Proceedings: the 33rd International Conference on Software Engineering, May 21, 2011, 10 Pages.
Qin,"pPen: Enabling Authenticated Pen and Touch Interaction on Tabletop Surfaces", In Proceedings of ITS 2010, Available at <http://www.dfki.de/its2010/papers/pdf/po172.pdf>, Nov. 2010, pp. 283-284
Ross,"IE9 Compat Inspector", Retrieved From: <http://blogs.msdn.com/b/ie/archive/2011/04/27/ie9-compat-inspector.aspx> Jun. 11, 2014, Apr. 27, 2011, 7 Pages.
Sumimoto,"Touch & Write: Surface Computing With Touch and Pen Input", Retrieved from: <http://www.gottabemobile.com/2009/08/07/touch-write-surface-computing-with-touch-and-pen-input/> on Jun. 19, 2012, Aug. 7, 2009, 4 pages.
Van"Lenovo Thinkpad Tablet 2 Review", Retrieved from: <http://www.digitaltrends.com/tablet-reviews/lenovo-thinkpad-tablet-2-review/> Jan. 29, 2014, Feb. 12, 2013, 7 Pages.
"Final Office Action", U.S. Appl. No. 13/010,552, Oct. 9, 2015, 30 pages.
"FOLDOC: Free On-Line Dictionary of Computing, definition for "Exception"", Retrieved from the Internet: http://web.archive.org/web/20100615211114/http://foldoc.org/exception, 1 page.
"Foreign Office Action", CN Application No. 201210018531.4, Sep. 6, 2015, 13 pages.
"International Search Report and Written Opinion", Application No. PCT/US2015/045985, Oct. 30, 2015, 10 Pages.
"International Search Report and Written Opinion", Application No. PCT/US2015/044402, Nov. 9, 2015, 10 pages.
"International Search Report and Written Opinion", Application No. PCT/US2015/045780, Oct. 22, 2015, 11 pages.
"International Search Report and Written Opinion", Application No. PCT/US2015/042551, Oct. 6, 2015, 13 Pages.
"International Search Report and Written Opinion", Application No. PCT/US2015/044944, Nov. 11, 2015, 13 pages.
"International Search Report and Written Opinion", Application No. PCT/US2015/045468, Oct. 29, 2015, 9 Pages.
"Non-Final Office Action", U.S. Appl. No. 14/450,023, Sep. 25, 2015, 18 pages.
"Non-Final Office Action", U.S. Appl. No. 14/468,699, Oct. 16, 2015, 8 pages.
"Non-Final Office Action", U.S. Appl. No. 14/477,014, Sep. 29, 2015, 18 pages.
Gao,"View: Visual Information Extraction Widget for Improving Chart Images Accessibility", Sep. 30, 2012, 4 pages.
Mishchenko,"Chart image understanding and numerical data extraction", Sixth International Conference on Digital Information Management (ICDIM), Sep. 26, 2011, 20 pages.
Savva,"ReVision: Automated Classification, Analysis and Redesign of Chart Images", Oct. 16, 2011, 10 pages.
"Final Office Action", U.S. Appl. No. 14/450,023, Feb. 2, 2016, 25 pages.
"Foreign Notice of Allowance", CN Application No. 201210018531.4, Feb. 4, 2016, 7 pages.
"International Search Report and Written Opinion", Application No. PCT/US2015/048218, Dec. 2, 2015, 11 pages.
"International Search Report and Written Opinion", Application No. PCT/US2015/045778, Dec. 15, 2015, 15 pages.
"Non-Final Office Action", U.S. Appl. No. 14/465,307, Jan. 29, 2016, 8 pages.
"Notice of Allowance", U.S. Appl. No. 14/468,699, Mar. 11, 2016, 8 pages.
Embley,"Table-Processing Paradigms: A Research Survey", International Journal of Document Analysis and Recognition, vol. 8, No. 2-3, May 9, 2006, pp. 66-86.
"Final Office Action", U.S. Appl. No. 14/477,014, Jun. 8, 2016, 20 pages.
"International Preliminary Report on Patentability", Application No. PCT/US2015/044402, Jul. 8, 2016, 7 pages.
"International Preliminary Report on Patentability", Application No. PCT/US2015/044944, Jul. 21, 2016, 8 pages.
"Notice of Allowance", U.S. Appl. No. 14/465,307, Jun. 6, 2016, 7 pages.
"Second Written Opinion", Application No. PCT/US2015/044402, Apr. 6, 2016, 4 pages.
"Second Written Opinion", Application No. PCT/US2015/045985, Aug. 1, 2016, 7 pages.
"Supplemental Notice of Allowance", U.S. Appl. No. 14/468,699, May 9, 2016, 4 pages.
"Supplemental Notice of Allowance", U.S. Appl. No. 14/468,699, Jun. 20, 2016, 4 pages.
"Corrected Notice of Allowance", U.S. Appl. No. 14/450,023, Oct. 28, 2016, 2 pages.
"International Preliminary Report on Patentability", Application No. PCT/US2015/045468, Oct. 5, 2016, 6 pages.
"Non-Final Office Action", U.S. Appl. No. 14/456,561, Sep. 26, 2016, 22 pages.
"Non-Final Office Action", U.S. Appl. No. 14/477,014, Nov. 21, 2016, 21 pages.
"Notice of Allowance", U.S. Appl. No. 14/450,023, Aug. 24, 2016, 5 pages.
"Notice of Allowance", U.S. Appl. No. 14/465,307, Aug. 12, 2016, 8 pages.
"Second Written Opinion", Application No. PCT/US2015/045780, Jul. 12, 2016, 4 pages.
"Second Written Opinion", Application No. PCT/US2015/048218, Aug. 9, 2016, 6 pages.
"Final Office Action", U.S. Appl. No. 14/477,014, May 31, 2017, 22 pages.
"Final Office Action", U.S. Appl. No. 14/456,561, May 15, 2017, 28 pages.
"Non-Final Office Action", U.S. Appl. No. 14/465,317, Mar. 24, 2017, 8 pages.
"Non-Final Office Action", U.S. Appl. No. 15/352,485, Apr. 7, 2017, 8 pages.
"Non-Final Office Action", U.S. Appl. No. 14/461,916, Jan. 17, 2017, 30 pages.
"International Preliminary Report on Patentability", Application No. PCT/US2015/045780, Nov. 3, 2016, 5 pages.
"International Search Report and Written Opinion", Application No. PCT/US2015/048218, Dec. 15, 2016, 7 pages.

(56) References Cited

OTHER PUBLICATIONS

"International Preliminary Report on Patentability", Application No. PCT/US2015/045985, Dec. 20, 2016, 8 pages.

* cited by examiner

GUARD BAND UTILIZATION FOR WIRELESS DATA COMMUNICATION

BACKGROUND

Many devices today utilize some form of wireless radio frequency (RF) data communication. Examples of RF communication include cellular networks (e.g., for cell phones), data broadband (e.g., Wi-Fi®), broadcast television, global positioning system (GPS) navigation, and so forth. Typically, different forms of RF communication use different portions of the radio spectrum. While many portions of the radio spectrum are allocated and/or licensed for particular uses, there remain portions that are underutilized. Underutilized portions of the radio spectrum may be leveraged for various purposes, such as for unlicensed forms of RF communication.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for guard band utilization for wireless data communication are described. In at least some embodiments, guard bands can be leveraged to transmit wireless broadband data and/or other forms of wireless data. According to one or more embodiments, signal activity in a wireless channel that is adjacent to a guard band is monitored, e.g., while the guard band is being utilized for wireless data communication. For instance, data that is received via a wireless channel within a guard band (a "guard band channel") is monitored for errors that may indicate that usage of the guard band channel is interfering with usage of other channels. In at least some implementations, if data errors detected in a guard band channel exceed a signal activity threshold, usage of the guard band channel can be adjusted to mitigate interference with signal activity in an adjacent channel. For instance, a width of the guard band channel may be reduced to increase the size of a buffer region between the guard band channel and an adjacent channel.

Alternatively or additionally, a signal activity threshold is defined that specifies a maximum signal strength in a channel that is adjacent to a guard band. If signal activity in the adjacent channel exceeds the signal activity threshold, usage of a guard band channel within the guard band can be adjusted according to techniques discussed herein.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
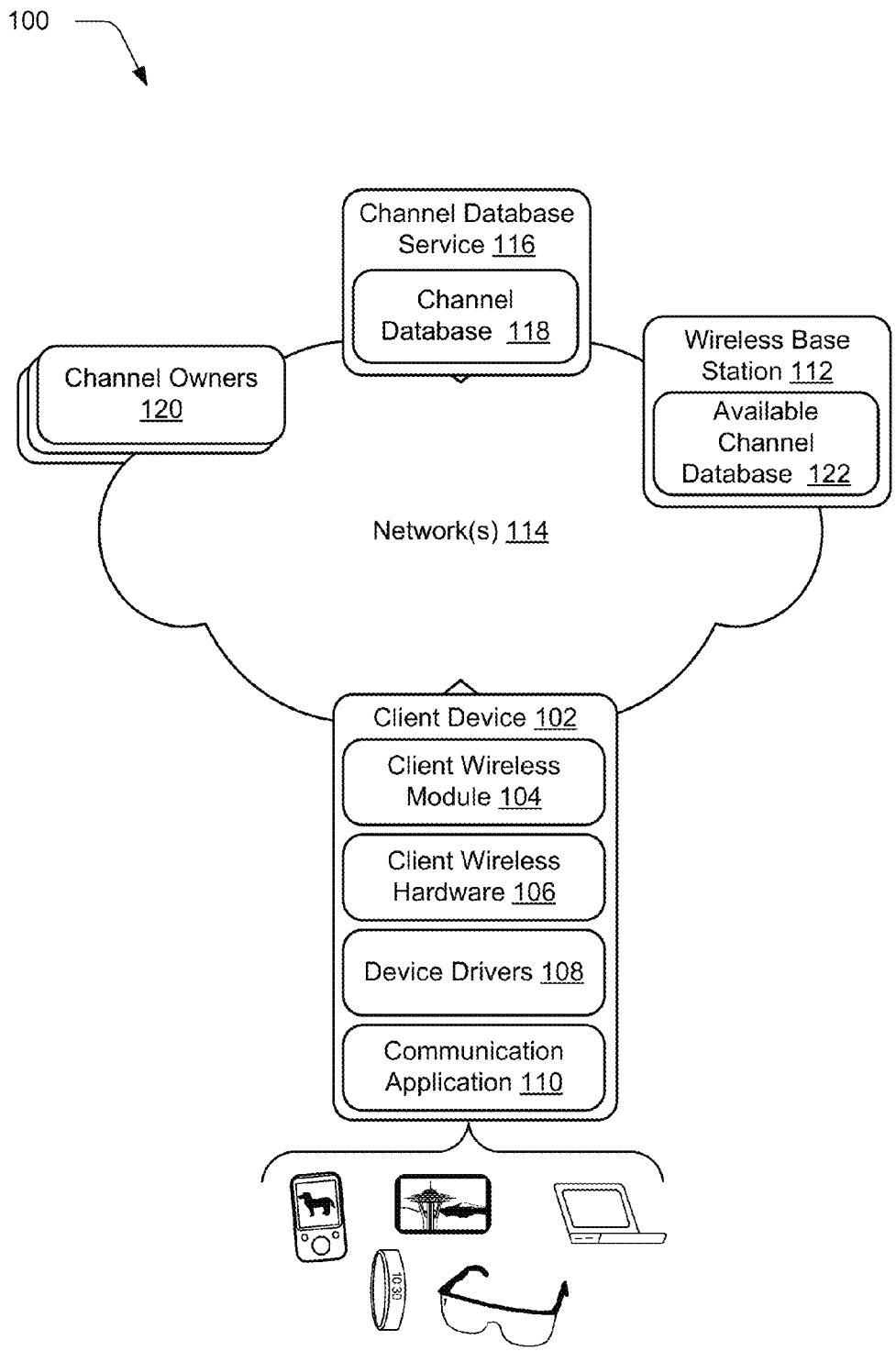
FIG. 1 is an illustration of an environment in an example implementation that is operable to employ techniques discussed herein in accordance with one or more embodiments.

Techniques for guard band utilization for wireless data communication are described. According to various implementations, guard bands between licensed portions of the radio spectrum are leveraged for data transmission.

For instance, implementations employ a channel database that tracks available guard bands and notifies various wireless base stations and/or client devices of the available guard bands. A client device may employ an available guard band for wireless data communication, such as for transmitting and receiving data according to one or more different wireless technologies.

In at least some implementations, guard bands can be leveraged to transmit wireless broadband data, such as for data transmission as part of a wireless local area network (WLAN). The data transmission, for example, can be performed according to the 802.11 Standards for wireless data communication managed by the Institute of Electrical and Electronics Engineers (IEEE). The 802.11 Standards are often referred to as "Wi-Fi®", but are referenced to herein in various ways.

According to one or more implementations, signal activity in wireless channels that are adjacent to a guard band is monitored, e.g., while the guard band is being utilized for wireless data communication. For instance, data that is received via a wireless channel within a guard band (a "guard band channel") is monitored for errors that may indicate that usage of the guard band channel is interfering with usage of other channels. For instance, usage of a guard band channel may interfere with licensed usage of an adjacent channel, such as cellular traffic, television broadcast, and so forth. Example indicators of such errors include bit error rate, bit error count, elevated cyclical redundancy rate (CRC) error count, and so forth.

In at least some implementations, a signal activity threshold is defined that specifies a threshold rate and/or number of data errors. If data errors detected in a guard band channel exceed the signal activity threshold, usage of the guard band channel can be adjusted to mitigate interference with signal activity in an adjacent channel. For instance, a width of the guard band channel may be reduced to increase the size of a buffer region between the guard band channel and an adjacent channel.

Alternatively or additionally, a signal activity threshold is defined that specifies a maximum signal strength in a channel that is adjacent to a guard band. If signal activity in the adjacent channel exceeds the signal activity threshold, usage of a guard band channel within the guard band can be adjusted according to techniques discussed herein.

In the following discussion, an example environment is first described that is operable to employ techniques described herein. Next, a section entitled "Example Implementation Scenarios" describes some implementation scenarios involving techniques discussed herein which may be employed in the example environment as well as in other environments. Following this, a section entitled "Example Procedures" describes some example procedures for guard band utilization for wireless data communication in accordance with one or more embodiments. Finally, a section entitled "Example System and Device" describes an example system and device that are operable to employ techniques discussed herein in accordance with one or more embodiments.

Example Environment

FIG. 1 is an illustration of an environment 100 in an example implementation that is operable to employ techniques for guard band utilization for wireless data communication. Generally, wireless data communication includes transmission and receipt of various types of wireless data, such as wireless broadband data, cellular data, and so forth. Environment 100 includes a client device 102 which can be embodied as any suitable device such as, by way of example and not limitation, a smartphone, a tablet computer, a portable computer (e.g., a laptop), a desktop computer, and so forth. One of a variety of different examples of a client device 102 is shown and described below in FIG. 12.

The client device 102 of FIG. 1 is illustrated as including a client wireless module 104, which is representative of functionality to enable the client device 102 to communicate wirelessly with other devices and/or entities. The client wireless module 104 can be configured to enable data communication via a variety of different wireless techniques and protocols. Examples of such techniques and/or protocols include cellular communications (e.g. 3G, 4G, Long Term Evolution (LTE), and so forth), near field communication (NFC), short-range wireless connections (e.g., Bluetooth), local area wireless networks (e.g., one or more standards in compliance with IEEE 802.11), wide area wireless networks (e.g., one or more standard in compliance with IEEE 802.16 or 802.22), wireless telephone networks, and so on. For instance, the client wireless module 104 is configured to perform various aspects of techniques for guard band utilization for wireless data communication discussed herein.

The client device 102 further includes client wireless hardware 106, which is representative of various hardware components that can be employed to enable the client device 102 to communicate wirelessly. Examples of the client wireless hardware 106 include radio transmitters, radio receivers, various types and/or combinations of antennas, impedance matching functionality, and so on. In at least some embodiments, the client device 102 is a multi-radio device that can communicate via different wireless technologies and/or protocols. For instance, the client wireless hardware 106 may include multiple antennas that are individually configured for different wireless technologies. The client wireless hardware 106, for example, may include a first antenna configured for cellular communications (e.g., Long-Term Evolution (LTE), 5G, and so forth), and a second antenna that is configured for wireless broadband, e.g., WiFi®.

Further included as part of the client device 102 are one or more device drivers 108, which are representative of functionality to enable the client device 102 to interact with various devices, and vice-versa. For instance, the device drivers 108 can enable interaction between various functionalities of the client device 102 (e.g., an operating system, applications, services, and so on) and different devices of the client device 102, such as input/output (I/O) devices. The device drivers 108, for instance, can enable interaction between the client wireless module 104 and the client wireless hardware 106 to enable the client device 102 to transmit and receive wireless signals.

In at least some embodiments, the client device 102 is configured to communicate with other devices and/or entities via a communication application 110. Generally, the communication application 110 is representative of functionality to enable different forms of communication via the client device 102. Examples of the communication application 110 include a voice communication application (e.g., a Voice over Internet Protocol (VoIP) client), a video communication application, a messaging application, a content sharing application, a Unified Communications (UC) application, and combinations thereof The communication application 110, for instance, enables different communication modalities to be combined to provide diverse communication scenarios.

The environment 100 further includes a wireless base station 112, which is representative of a radio receiver and transmitter that serves as a hub for at least some wireless portions of network(s) 114. In at least some embodiments, the wireless base station 112 may serve as a gateway between wired and wireless portions of the network(s) 114. The wireless base station 112 also includes functionality for performing various aspects of the techniques for guard band utilization for wireless data communication discussed herein, which are discussed in detail below. According to one or more embodiments, the wireless base station 112 includes functionality for wireless communication via a variety of different wireless technologies and protocols, examples of which are discussed elsewhere herein.

Generally, the network 114 is representative of a single network or a combination of different interconnected networks. In at least some embodiments, the network 114 represents different portions of the radio spectrum that may be leveraged for wireless communication. The network 114, for instance, represents radio spectrum in different frequency bands, such as ultra-high frequency (UHF), super-high frequency (SHF), and so forth. The network 114 may also represent a combination of wireless and wired networks and may be configured in a variety of ways, such as a wide area network (WAN), a local area network (LAN), the Internet, and so forth.

The environment 100 further includes a channel database service 116, which is representative of functionality to track and/or manage various attributes of wireless channels. The channel database service 116, for instance, can track channel utilization for different wireless channels, e.g., whether a particular wireless channel is in use and/or is available to be used for wireless communication, level of channel usage for different channels, and so forth. The channel database service 116 may track and monitor various other attributes of wireless channel, such as channel quality, signal-to-noise ratios for different channels, noise floor in particular channels, and so forth. For example, the channel database service 116 maintains a channel database 118 that stores status information for different wireless channels. As further detailed below, the channel database service 116 may provide channel information from the channel database 118 to different entities (e.g., the wireless base station 112 and/or the client device 102) to enable wireless channels to be selected for wireless communication.

In at least some embodiments, the channel database service 116 receives information regarding wireless channels from channel owners 120. Generally, the channel owners 120 are representative of different entities that have certain rights and/or privileges to different portions of the radio spectrum. For instance, the channel owners 120 may represent licensees of certain portions of the radio spectrum in a particular market and/or markets, such as television networks, cellular carriers, radio stations, and so forth. The channel owners 120 may also represent entities that are granted exclusive or shared access to particular frequency bands, such as government organizations, emergency services, academic and/or research entities, and so forth. Generally, licenses and privileges for access to different portions of the radio spectrum are regulated by government organizations, such as the Federal Communications Commission (FCC) in the United States, the Office of Communications (OFCOM) in the United Kingdom, and so forth.

As further illustrated in the environment 100, the wireless base station 112 includes an available channel database 122, which is representative of a database of wireless channels that are available for wireless communication in the network 114. The available channel database 122, for instance, can be populated with channel information received from the channel database service 116. In at least some embodiments, available channel information from the available channel database 122 can be propagated to the client device 102 to enable a channel and/or channels to be selected for wireless communication. Further details concerning identification and selection of wireless channels are presented below.

According to implementations discussed herein, techniques can be employed to establish wireless data communication between the client device 102 and other devices utilizing a variety of different wireless data communication techniques and/or protocols. For instance, channels that are identified in the available channel database 122 may be leveraged for wireless communication via various of the 802.11 standards. This is not intended to be limiting, however, and a wide variety of different wireless techniques and protocols may be utilized in accordance with the disclosed embodiments. Further, while certain aspects of established wireless protocols (e.g., 802.11, Wi-Fi Direct™, and so on) may be utilized in tandem with techniques discussed herein to enable wireless data communication between devices, techniques discussed herein are inventive and are not to be considered part of these protocols as they currently exist.

Having described an example environment in which the techniques described herein may operate, consider now a discussion of some example implementation scenarios in accordance with one or more embodiments.

Example Implementation Scenarios

The following discussion describes example implementation scenarios for guard band utilization for wireless data communication in accordance with one or more embodiments. In portions of the following discussion, reference will be made to the environment 100 of FIG. 1.

Figure 2:
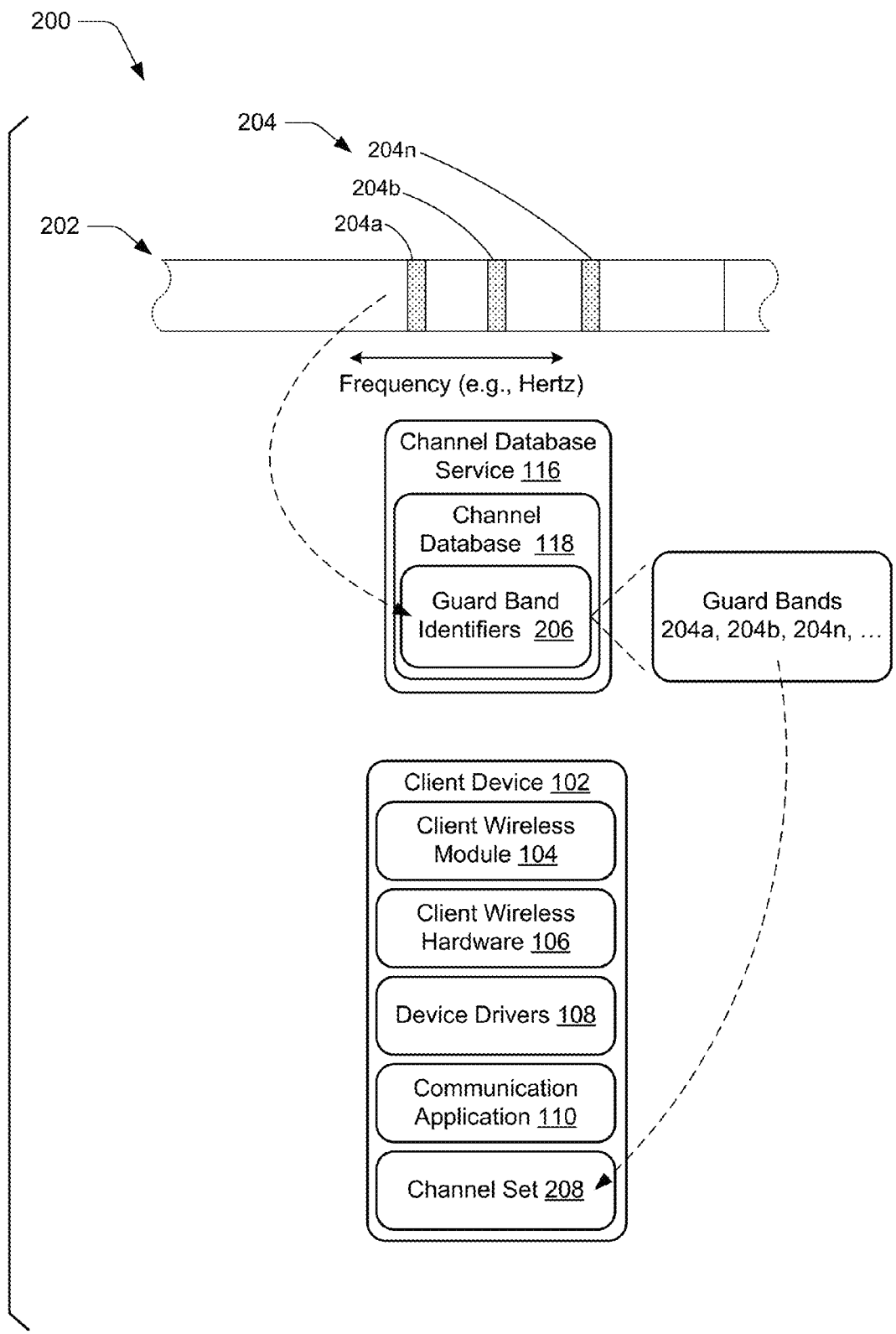
FIG. 2 illustrates an example implementation scenario for determining available guard bands for wireless communication in accordance with one or more embodiments.

FIG. 2 illustrates an example implementation scenario 200 for determining available guard bands for wireless communication in accordance with one or more embodiments.

In the scenario 200, the channel database service 116 determines that a spectrum portion 202 of the radio spectrum includes a set of guard bands 204, including a guard band 204*a*, a guard band 204*b*, and a guard band 204*n*. Generally, the guard bands 204 represent unused regions of the radio spectrum that separate different licensed regions of the radio spectrum. The guard bands 204, for example, serve as buffers to minimize and/or prevent interference between adjacent licensed portions of the spectrum portion 202. According to one or more implementations, for example, one or more of the guard bands 204 represent a duplex gap between uplink and downlink portions of the LTE portion of the radio spectrum. This is not to be construed as limiting, however, and the guard bands 204 may occur in a variety of different portions of the radio spectrum.

Further to the scenario 200, the channel database service 116 stores guard band identifiers 206 for the guard bands 204 as part of the channel database 118. The channel database service 116 then provides the guard band identifiers 206 to the client device 102, such as in response to a query from the client device 102 for available wireless channels. The guard band identifiers 206 may identify the guard bands 204 in various ways, such as with reference to frequency ranges for the individual available channels 204, channel numbers for channels that are adjacent the guard bands 204 (e.g., assigned based on a regional band plan), and so forth.

In at least some embodiments, for instance, the client device 102 (e.g., via the client wireless module 104) can query the channel database service 116 for available guard bands on a periodic basis (e.g., every 24 hours) and/or in response to various events, such as an initiation of a communication session via the communication application 110. The client device 102 stores the guard band identifiers 206 as part of a channel set 208 that generally corresponds to channels that are available to the client device 102 for wireless communication. According to various implementations, the channel set 208 may identify other available channels in addition to the guard bands 204. The client device 102 may utilize one or more channels identified in the channel set 208 to initiate and/or participate in wireless data communication.

Figure 3:
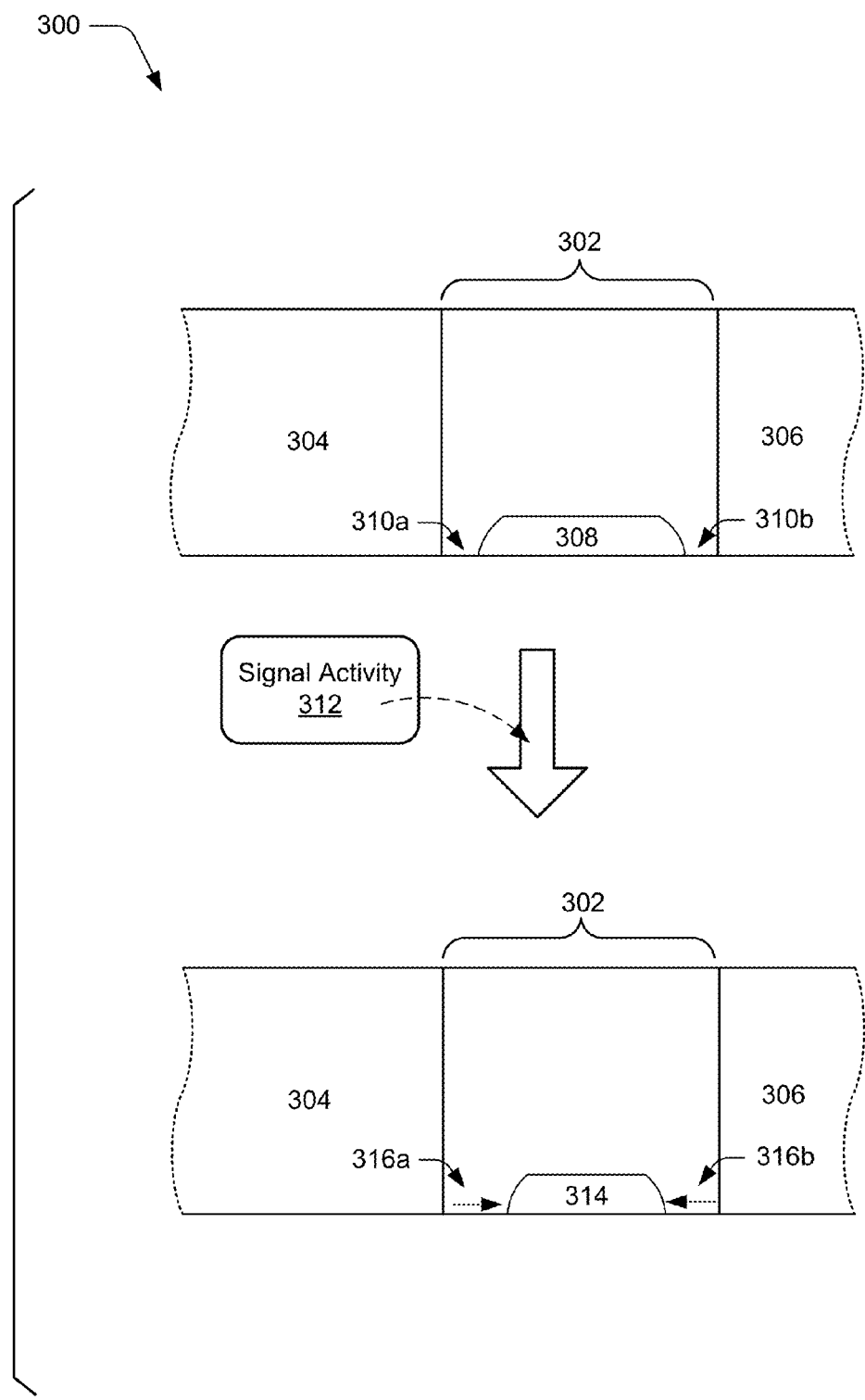
FIG. 3 illustrates an example implementation scenario for determining guard band usage for wireless data communication in accordance with one or more embodiments.

FIG. 3 illustrates an example implementation scenario 300 for determining guard band usage for wireless data communication in accordance with one or more embodiments. In at least some embodiments, the scenario 300 represents an extension of the scenario 200 discussed above.

The upper portion of the scenario 300 illustrates a guard band 302 which, in at least some embodiments, represents an implementation of one or more of the guard bands 204 introduced above. Adjacent to the guard band 302 is a licensed region 304 and a licensed region 306, which represent regions of the radio spectrum that are licensed and/or allocated for particular purposes. In at least some embodiments, the licensed regions 304, 306 represent implementations of a cellular downlink portion and a cellular uplink portion of the radio spectrum, respectively.

Further to the scenario 300, a communication channel 308 within the guard band 302 is utilized for wireless data communication. For instance, the client device 102 utilizes the communication channel 308 to transmit and receive wireless signals, such as part of a communication session implemented by the communication application 110. Generally, the communication channel 308 represents a discrete frequency band within the guard band 302 that can be utilized to transmit and/or receive data, such as for wireless broadband. Although a single communication channel 308 is illustrated, embodiments may employ multiple communication channels within a guard band.

Consider, for example, that the guard band 302 is 10 megahertz (MHz) in width. Accordingly, the communication channel 308 is initially selected as a portion of 10 MHz. For purposes of the scenario 300, the communication channel 308 is initially implemented as an 8 MHz channel within the guard band 302. The communication channel 308, for instance, may be centered within the guard band 302. For instance, the communication channel 308 is defined such that the guard band 302 includes a buffer region 310a and a buffer region 310b on either side of the communication channel 308, respectively. The buffer regions 310a, 310b aid in mitigating interference between wireless communication in the communication channel 308, and wireless communication in an adjacent channel, e.g., the licensed region 304 and/or the licensed region 306.

Continuing with the scenario 300, signal activity 312 is detected in a region of the radio spectrum that is near the guard band 302. The signal activity 312, for instance, may occur in the licensed region 304 and/or the licensed region 306. Alternatively or additionally, the signal activity 312 may occur in a wireless channel that occurs at a higher and/or lower frequency than the licensed regions 304, 306. Example ways of detecting the signal activity 312 are discussed below. In at least some implementations, the signal activity 312 corresponds to a licensed use of the radio spectrum, such as for cellular communication, broadcast television, and so forth.

Proceeding to the lower portion of the scenario 300, and in response to detecting the signal activity 312, the width of the communication channel 308 is reduced to generate an adjusted communication channel 314. The width of the communication channel 308, for instance, is reduced from 8 MHz to 6 MHz to generate a 6 MHz adjusted communication channel 314. According to various implementations, the width of the communication channel 308 is reduced in an attempt to mitigate interference with the signal activity 312. As referenced above, the communication channel 308 may be centered within the guard band 302. In such implementations, the width of the communication channel 308 may be decreased without changing the center frequency. Thus, the center frequency of the adjusted communication channel 314 may be centered within the guard band 302. The adjusted communication channel 314 causes the buffer regions 310a, 310b to be enlarged to generate an adjusted buffer region 316a and an adjusted buffer region 316b that separate the adjusted communication channel 314 from the licensed regions 304, 306, respectively. According to various implementations, the adjusted buffer regions 316a, 316b provide for increased separation between wireless transmission within the guard band 302 and signal activity in the licensed regions 304, 306, thus mitigating interference between the different wireless signal activities.

In at least some implementations, the illustrated channel adjustment may occur dynamically. For instance, in implementations where the communication channel 308 is utilized for a communication session, adjusting the communication channel 308 to generate the adjusted communication channel 314 may occur while the communication session is in progress.

According to one or more implementations, transmission power within a communication channel may be increased when channel width is decreased. For instance, transmission power over the adjusted communication channel 314 may be increased with respect to the transmission power utilized for the communication channel 308. Increasing the transmission power utilized for the communication channel 314 may mitigate the effect of decreasing channel width, such as the effect on signal power, signal quality, and so forth, on wireless data communication within the guard band 302. Consider, for example, the following implementation scenario.

Figure 4:
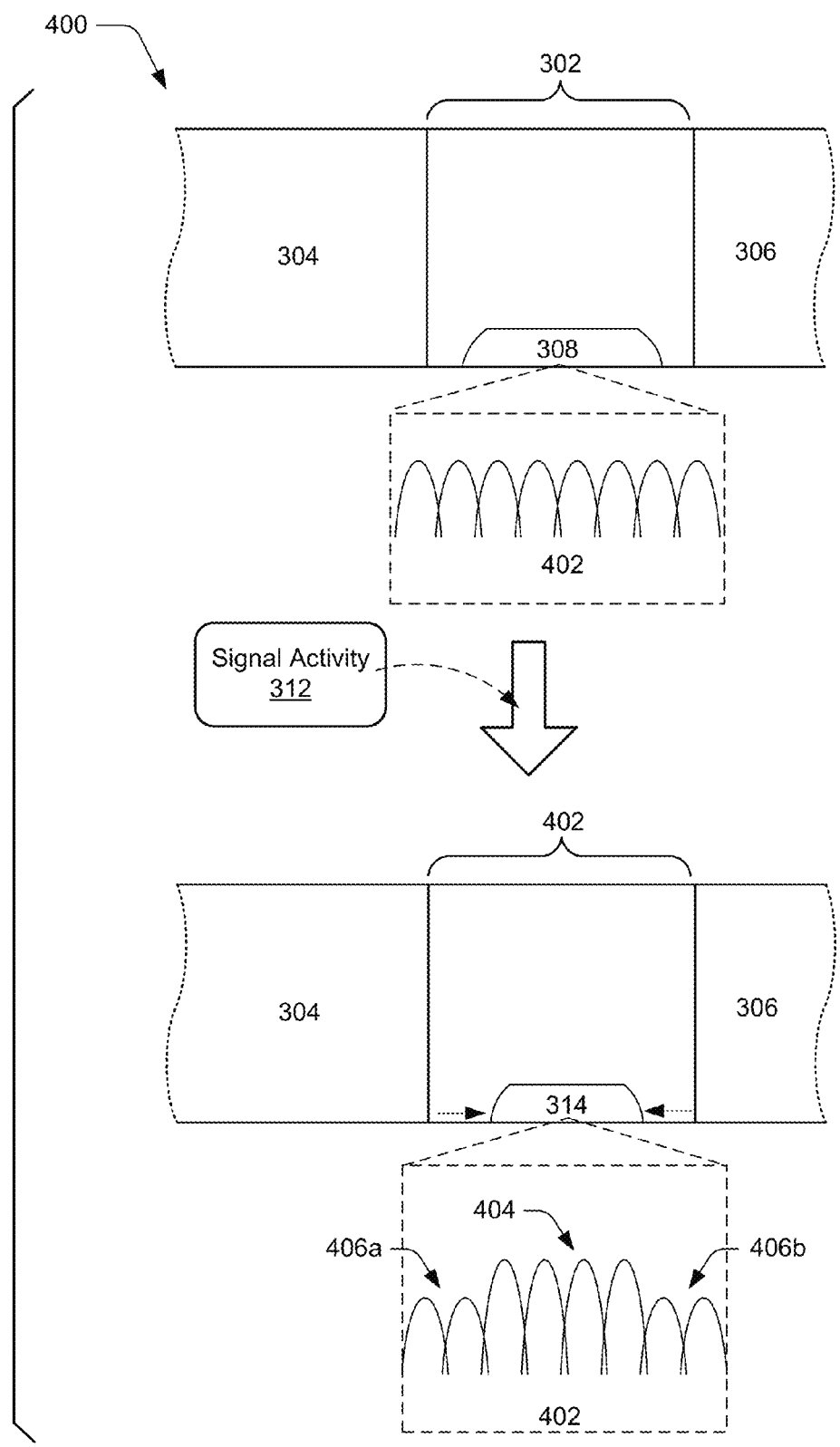
FIG. 4 illustrates an example implementation scenario for determining guard band usage for wireless data transmission in accordance with one or more embodiments.

FIG. 4 illustrates an example implementation scenario 400 for determining guard band usage for wireless data transmission in accordance with one or more embodiments. In at least some embodiments, the scenario 400 represents an extension of the scenario 300 discussed above.

In the upper portion of the scenario 400, consider that the communication channel 308 is being used to transmit a signal 402. In at least some embodiments, the signal 402 is an orthogonal frequency-division multiplexing (OFDM) signal that utilizes subcarrier signals. The signal 402, for instance, can be implemented as a WiFi™ OFDM signal that is divided into 52 subcarriers signals. The number of subcarriers illustrated as part of the signal 402 is presented for purpose of example only, and it is to be appreciated that any suitable number of subcarriers may be employed.

Consider now that the signal activity 312 is detected and the adjusted communication channel 314 is generated, such as discussed above. In addition to reducing the width of the communication channel 308, at least some subcarriers of the signal 402 are modified.

For example, proceeding to the lower portion of the scenario 400, transmission power of inner subcarriers 404 of the signal 402 within the adjusted communication channel 314 is increased, such as by a pre-specified amount. Optionally, transmission power in the outer subcarriers 406a, 406b of the signal 402 is attenuated.

According to one or more embodiments, increasing transmission power over the inner subcarriers 404 may prevent or mitigate loss of signal power and/or signal quality within the adjusted communication channel 314 that may be caused by reducing the channel width.

Having discussed some example implementation scenarios, consider now some example procedures in accordance with one or more embodiments.

Example Procedures

Figure 5:
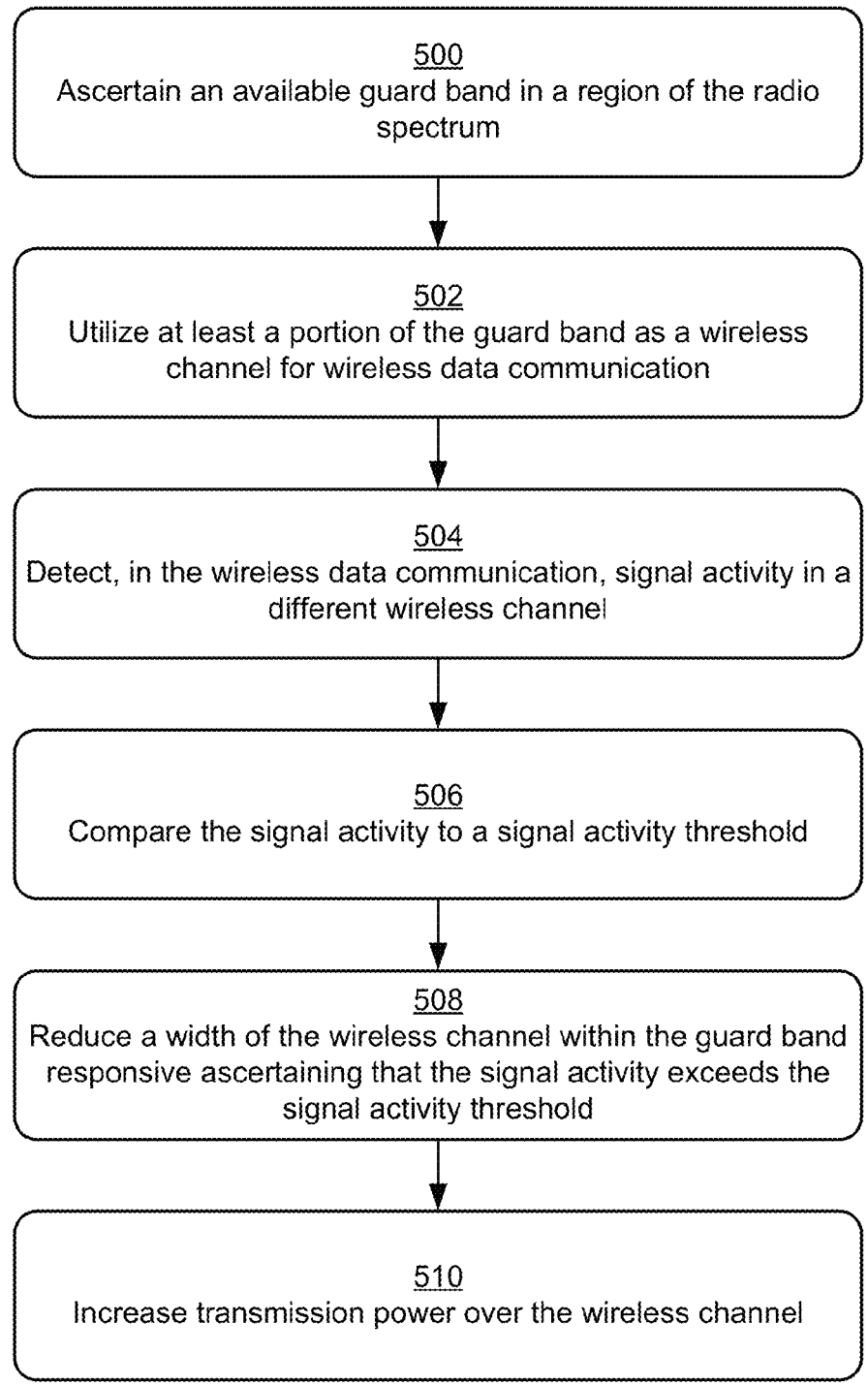
FIG. 5 is a flow diagram that describes steps in a method for utilizing a guard band for wireless data communication in accordance with one or more embodiments.

FIG. 5 is a flow diagram that describes steps in a method for utilizing a guard band for wireless data communication in accordance with one or more embodiments.

Step 500 ascertains an available guard band in a region of the radio spectrum. The channel database service 116, for instance, notifies the wireless base station 112 of the available guard band. The wireless base station 112 then notifies the client device 102 that the guard band is available for wireless data communication. In accordance with various embodiments, the wireless base station 112 may notify the client device 102 of multiple wireless channels that are available, such as multiple guard bands, multiple white spaces, and so forth. White spaces generally refer to portions of the radio spectrum that are licensed for a particular use (e.g., television broadcasting), but that are not currently being used for such licensed use. Thus, according to various implementations, such white spaces may be leveraged for unlicensed use, such as wireless data communication.

Step 502 utilizes at least a portion of the guard band as a wireless channel for wireless data communication. The client device 102, for instance, uses a portion of the guard band to transmit and receive wireless data. In at least some implementations, the portion of the guard band may be selected such that buffer regions exist between the wireless channel and adjacent wireless channels, such as adjacent licensed regions. According to one or more implementations, a guard band may be divided into multiple different and separate wireless channels that may each be utilized for wireless data communication.

According to various implementations, the wireless channel may be used with one or more other wireless channels for the wireless data communication. For instance, other wireless channels may be selected, such as from the same guard band, other guard bands, from white spaces, licensed channels, and so forth. In such implementations, the wireless channel from the guard band may be aggregated with other channels to enable multi-channel wireless communication.

Step 504 detects, in the wireless data communication, signal activity in a different wireless channel. For example, the different wireless channel may correspond to a channel that is adjacent to the guard band, such as a licensed channel. Example ways of detecting signal activity are detailed below, and include detecting different error rates and/or error counts in received wireless data, detecting signal strength in a different wireless channel, and so forth.

Step 506 compares the signal activity to a signal activity threshold. The signal activity threshold, for instance, corresponds to a threshold error rate, a threshold error count, a threshold signal strength in a different wireless channel, and so forth.

Step 508 reduces a width of the wireless channel within the guard band responsive ascertaining that the signal activity exceeds the signal activity threshold. As discussed above, the channel width may be reduced without changing the center frequency of the wireless channel.

Step 510 increases transmission power over the wireless channel. The transmission power, for instance, is increased along with reducing the channel width. According to various implementations, increasing the transmission power is optional.

In at least some implementations, a wireless base station (e.g., a wireless access point) through which the wireless data communication is routed is notified of the reduced width of the wireless channel, and optionally of the increased transmission power. Notifying the base station of the adjusted width enables the base station to adjust its own settings regarding usage of the wireless channel and/or other wireless channels within the guard band.

Figure 6:
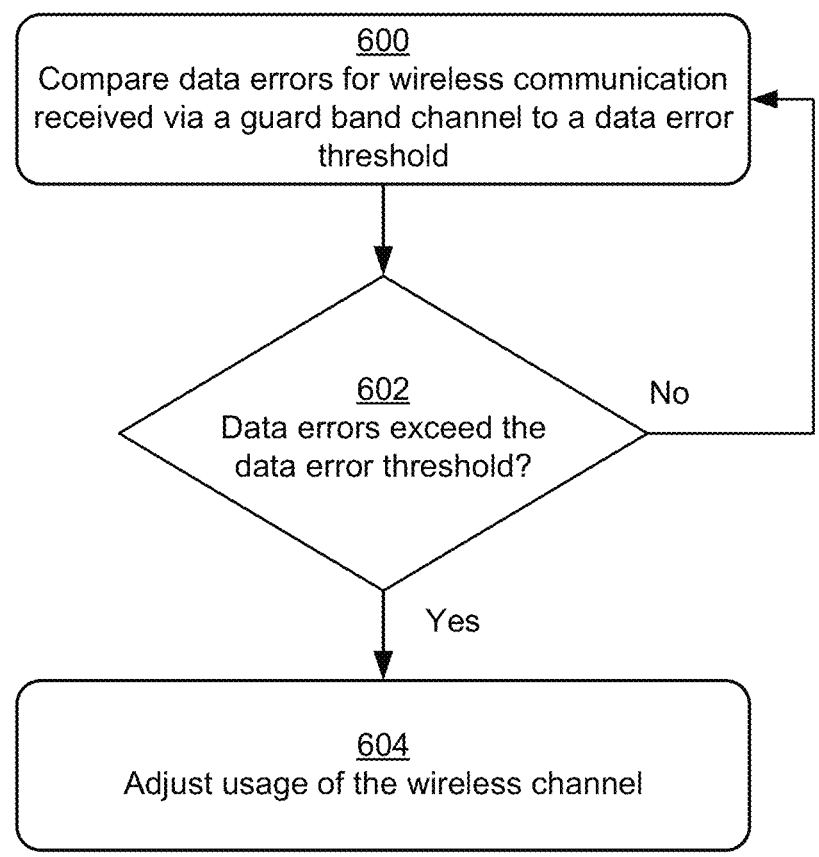
FIG. 6 is a flow diagram that describes steps in a method for determining based on data errors whether to adjust utilization of a guard band for wireless data communication in accordance with one or more embodiments.

FIG. 6 is a flow diagram that describes steps in a method for determining based on data errors whether to adjust utilization of a guard band for wireless data communication in accordance with one or more embodiments.

Step 600 compares data errors for wireless communication received via a guard band channel to a data error threshold. The wireless communication, for instance, is received via a wireless channel within a guard band, such as discussed above. In at least some implementations, the data errors can be determined and the data error threshold can be defined in various ways, such as based on bit error rate, packet error rate, bit error count, packet error count, cyclical redundancy check (CRC) error count, forward error correction (FEC) error count, and so forth. Thus, a data error threshold may correspond to a discrete rate and/or number of errors, such as based on the different ways of detecting data errors discussed above.

Step 602 ascertains whether the data errors exceed the data error threshold. If the data errors do not exceed the data error threshold ("No"), the method returns to step 600. If the data errors exceed the data error threshold ("Yes"), step 604 adjusts usage of the wireless channel. For instance, the width of the wireless channel may be reduced, such as discussed above. In at least some implementations, transmission power over the wireless channel may be increased along with reduction of the channel width. According to various implementations, adjusting usage of the wireless channel mitigates interference with signal activity that causes at least some of the data errors, such as signal traffic in an adjacent and/or nearby licensed region.

Figure 7:
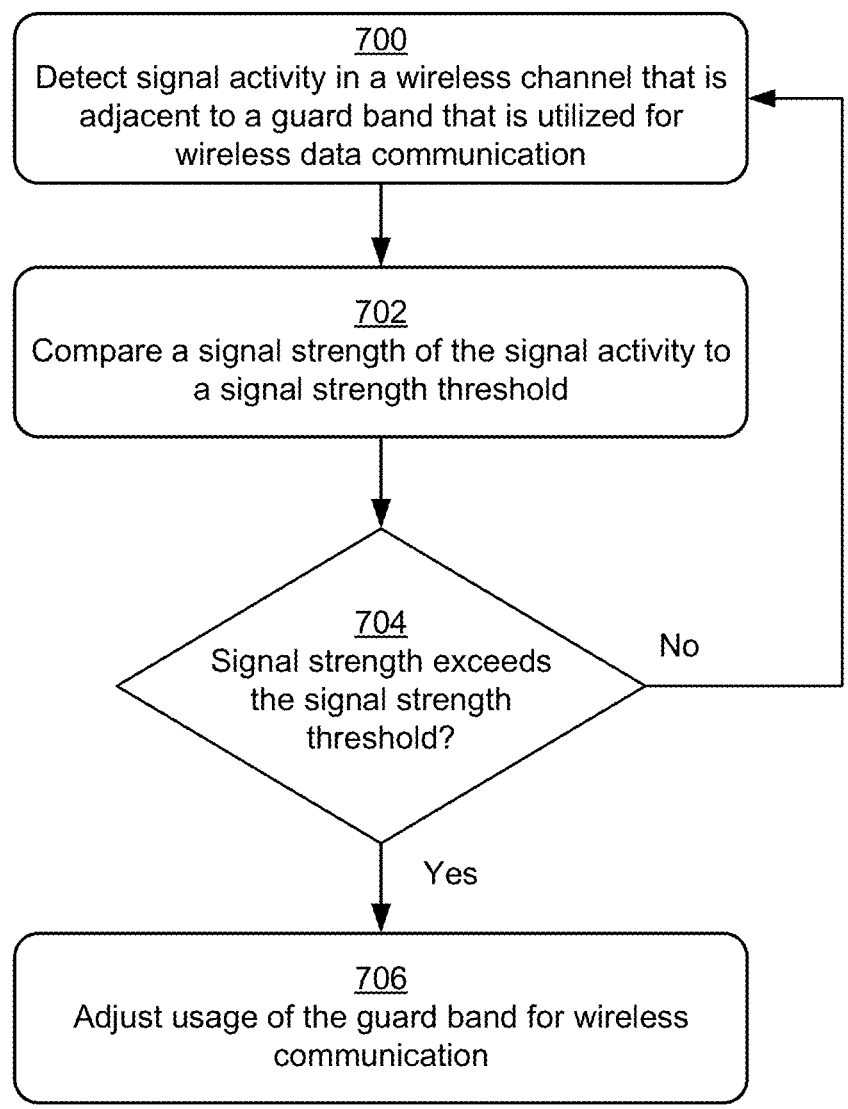
FIG. 7 is a flow diagram that describes steps in a method for determining based on signal strength in a different channel whether to adjust utilization of a guard band for wireless data communication in accordance with one or more embodiments.

FIG. 7 is a flow diagram that describes steps in a method for determining based on signal strength in a different channel whether to adjust utilization of a guard band for wireless data communication in accordance with one or more embodiments.

Step 700 detects signal activity in a wireless channel that is adjacent to a guard band that is utilized for wireless data communication. For example, the wireless channel corresponds to a licensed region of radio spectrum. The signal activity, for instance, corresponds to a licensed usage of the wireless channel, such as for cellular communication, television broadcast, and so forth.

Step 702 compares a signal strength of the signal activity to a signal strength threshold. The signal strength threshold may be defined in various ways, such as a threshold received signal strength indicator (RSSI), a threshold signal-to-noise (S/N) ratio, a threshold power level (e.g., in milliwatts (mW), Decibel-milliwatts (dBm), and so forth), and so on.

Step 704 ascertains whether the signal strength exceeds the signal strength threshold. If the signal strength does not exceed the signal strength threshold ("No"), the method returns to step 700. If the signal strength exceeds the signal strength threshold ("Yes"), step 706 adjusts usage of the guard band for wireless communication. For instance, the width of a wireless channel within the guard band may be reduced, such as discussed above. In at least some implementations, transmission power over the wireless channel within the guard band may be increased along with reduction of the channel width. According to various implementations, adjusting usage of the guard band mitigates interference with the signal activity in the adjacent wireless channel.

In at least some implementations, the methods discussed above with reference to FIGS. 6 and 7 can be combined. For instance, consider the following example procedure.

Figure 8:
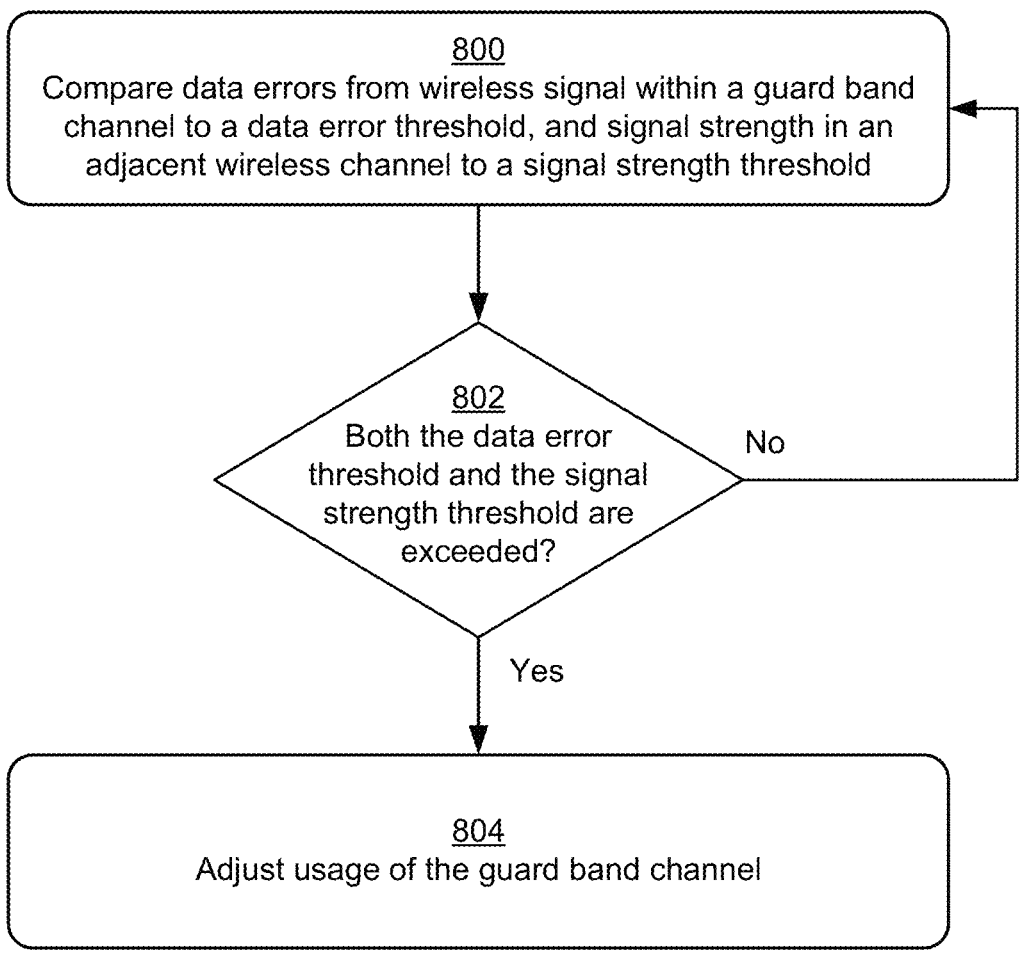
FIG. 8 is a flow diagram that describes steps in a method for determining based on data errors in a guard band channel and signal strength in a different wireless channel whether to adjust utilization of a guard band channel in accordance with one or more embodiments.

FIG. 8 is a flow diagram that describes steps in a method for determining based on data errors in a guard band channel and signal strength in a different wireless channel whether to adjust utilization of a guard band channel in accordance with one or more embodiments.

Step 800 compares data errors from wireless signal within a guard band channel to a data error threshold, and signal strength in an adjacent wireless channel to a signal strength threshold. The guard band channel, for instance, corresponds to a frequency range defined within a guard band, such as the communication channel 308 discussed above. In at least some implementations, step 800 may be performed via two different antennas. For instance, the data errors detected within the guard band channel may be detected based on a first signal received via a first antenna, such as a wireless broadband signal. Further, the signal strength in the adjacent wireless channel may be detected based on a second signal received via a second antenna, such as a cellular signal. Thus, in at least some implementations, the data errors of the first signal and the signal strength of the second signal may be concurrently and/or simultaneously detected.

Step 802 ascertains whether both the data error threshold and the signal strength threshold are exceeded. In at least some implementations, step 802 can be applied over a discrete time interval, such as 0.5 seconds, 1 second, and so forth, to determine whether both thresholds are exceeded for a particular period of time.

If both the data error threshold and the signal strength threshold are not exceeded ("No"), the method returns to step 800. For instance, if both the data error threshold and the signal strength threshold are not exceeded, usage of the guard band channel may remain unadjusted.

If both the data error threshold and the signal strength threshold are exceeded ("Yes"), step 804 adjusts usage of the guard band channel, such as discussed above.

In at least some implementations, further activity thresholds may be leveraged to further adjust guard band usage. For instance, consider the following example procedure.

Figure 9:
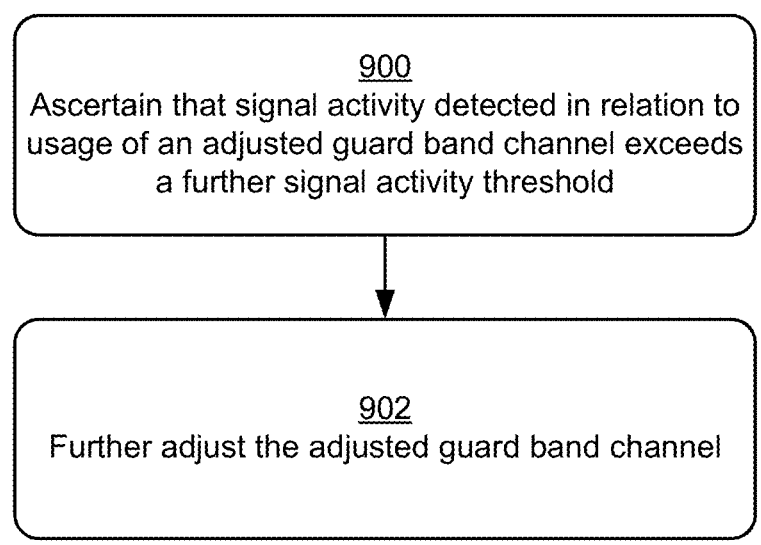
FIG. 9 is a flow diagram that describes steps in a method for adjusting guard band usage based on a further signal activity threshold in accordance with one or more embodiments.

FIG. 9 is a flow diagram that describes steps in a method for adjusting guard band usage based on a further signal activity threshold in accordance with one or more embodiments.

Step 900 ascertains that signal activity detected in relation to usage of an adjusted guard band channel exceeds a further signal activity threshold. The adjusted guard band channel, for instance, was previously adjusted based on a signal activity threshold, such as the adjusted communication channel 314 discussed above. The further signal activity threshold may be in addition to the signal activity threshold(s) discussed above, such as an additional data error threshold, an additional signal strength threshold, and so forth. In at least some implementations, the further signal activity threshold may include a combination of thresholds, such as a combined data error and signal strength threshold.

Step 902 further adjusts the adjusted guard band channel. The wireless channel, for example, is further adjusted in response to ascertaining that the signal activity exceeds the further signal activity threshold. For instance, the width of the wireless channel is further reduced. Optionally, transmission power over the wireless channel is further increased. In at least some implementations, further adjusting the wireless channel may include ceasing to use the wireless channel for wireless data communication. For instance, the level of signal activity detected may indicate that the guard band may not be employed to provide sufficient signal strength and/or S/N ratio for wireless communication without adversely interfering with wireless communication in an adjacent and/or nearby channel.

Thus, in at least some implementations, multiple signal activity thresholds may be employed. As signal activity exceeds the individual thresholds, different adjustments may be made to guard band utilization. For instance, a width of a wireless channel within a guard band may be reduced multiple times in response to detecting increasing levels of signal activity in an adjacent channel. Surpassing a final signal activity threshold may cause usage of the guard band to be discontinued. For instance, a different wireless channel (e.g., within a different guard band) may be located to replace the current wireless channel within the current guard band.

Having discussed some example procedures, consider now a discussion of an example system and device in accordance with one or more embodiments.

Example System And Device

Figure 10:
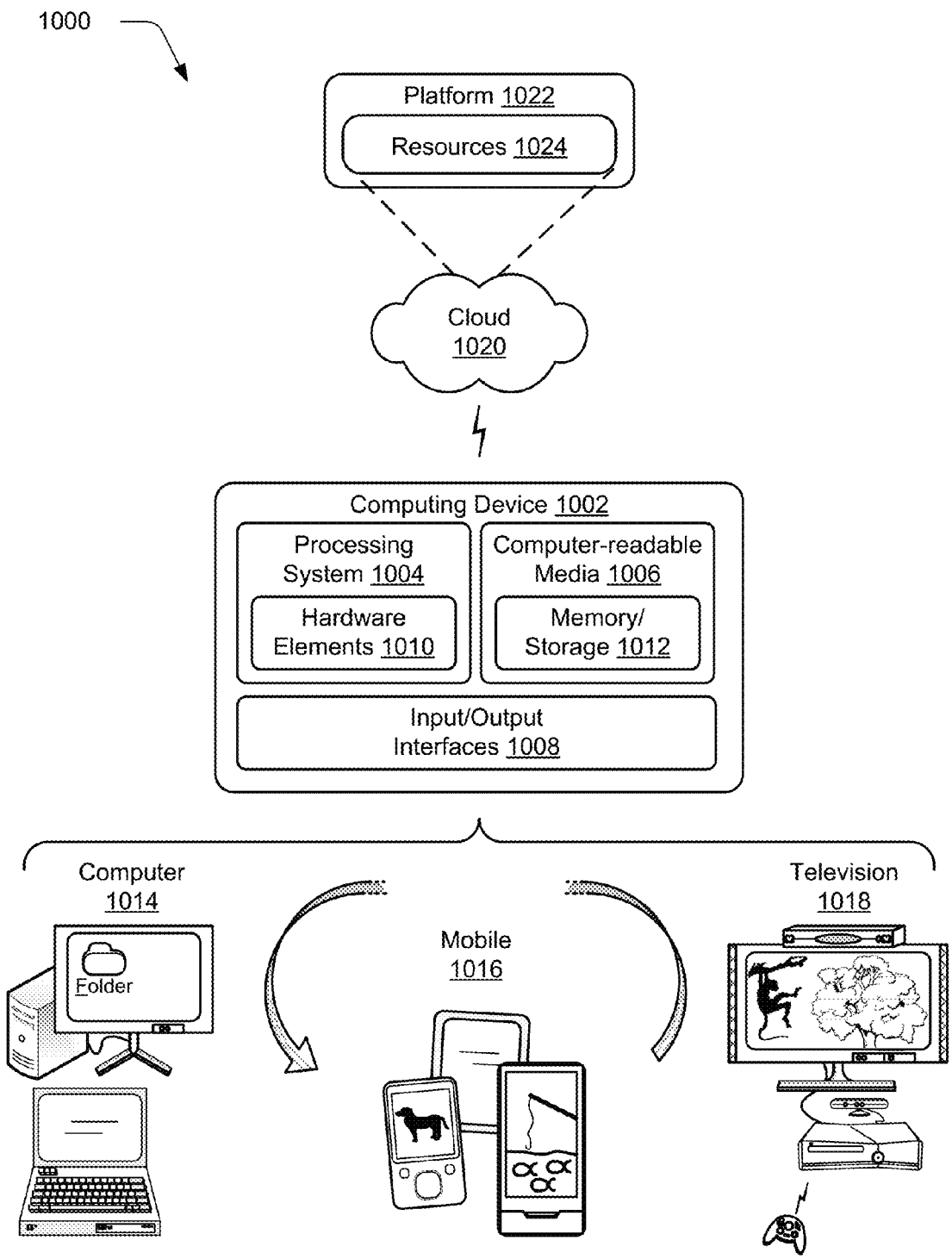
FIG. 10 illustrates an example system and computing device as described with reference to FIG. 1, which are configured to implement embodiments of techniques described herein.

FIG. 10 illustrates an example system generally at 1000 that includes an example computing device 1002 that is representative of one or more computing systems and/or devices that may implement various techniques described herein. For example, the client device 102 discussed above with reference to FIG. 1 can be embodied as the computing device 1002. The computing device 1002 may be, for example, a server of a service provider, a device associated with the client (e.g., a client device), an on-chip system, and/or any other suitable computing device or computing system.

The example computing device 1002 as illustrated includes a processing system 1004, one or more computer-readable media 1006, and one or more I/O Interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone (e.g., for implementing voice and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth.

Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules discussed herein as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1014, mobile 1016, and television 1018 uses. Each of these configurations includes devices that may have generally different constructs and capabilities, and thus the computing device 1002 may be configured according to one or more of the different device classes. For instance, the computing device 1002 may be implemented as the computer 1014 class of a device that includes a personal computer, desktop computer, a multi-screen computer, laptop computer, netbook, and so on.

The computing device 1002 may also be implemented as the mobile 1016 class of device that includes mobile devices, such as a mobile phone, portable music player, portable gaming device, a tablet computer, a multi-screen computer, and so on. The computing device 1002 may also be implemented as the television 1018 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. For example, functionalities discussed with reference to the client device 102, the wireless base station 112, and/or the channel database service 116 may be implemented all or in part through use of a distributed system, such as over a "cloud" 1020 via a platform 1022 as described below.

The cloud 1020 includes and/or is representative of a platform 1022 for resources 1024. The platform 1022 abstracts underlying functionality of hardware (e.g., servers) and software resources of the cloud 1020. The resources 1024 may include applications and/or data that can be utilized while computer processing is executed on servers that are remote from the computing device 1002. Resources 1024 can also include services provided over the Internet and/or through a subscriber network, such as a cellular or Wi-Fi™ network.

The platform 1022 may abstract resources and functions to connect the computing device 1002 with other computing devices. The platform 1022 may also serve to abstract scaling of resources to provide a corresponding level of scale to encountered demand for the resources 1024 that are implemented via the platform 1022. Accordingly, in an interconnected device embodiment, implementation of functionality described herein may be distributed throughout the system 1000. For example, the functionality may be implemented in part on the computing device 1002 as well as via the platform 1022 that abstracts the functionality of the cloud 1020.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Conclusion

Techniques for guard band utilization for wireless data communication are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
one or more processors; and
one or more computer-readable storage devices storing computer-executable instructions that are executable by the one or more processors to perform operations including:
utilizing at least a portion of a guard band as a wireless channel for wireless data communication;
utilizing a different portion of the guard band for mitigating interference between the wireless data communication in the wireless channel and signal activity in a different wireless channel that is adjacent to the guard band;
detecting signal activity in the different wireless channel;
detecting data errors in relation to the wireless data communication over the wireless channel;
comparing the data errors to a data error threshold; and
reducing a width of the wireless channel within the guard band used for the wireless data communication responsive to ascertaining that the detected data errors exceed the data error threshold.

2. The system as described in claim 1, wherein the operations further include utilizing at least one other guard band for the wireless data communication such that multiple guard bands are used for the wireless data communication.

3. The system as described in claim 1, wherein the guard band comprises a duplex gap between a downlink channel and an uplink channel.

4. The system as described in claim 1, wherein said detecting the data errors is based on at least one of a packet error rate or a packet error count for packets received via the wireless channel, and the data error threshold comprises at least one of a packet error rate threshold or a packet error count threshold.

5. The system as described in claim 1, wherein said detecting the data errors is based on a detected data error in the different wireless channel.

6. The system as described in claim 5, wherein the wireless data communication is implemented via a first antenna, and wherein the data error in the different wireless channel is detected via a second antenna.

7. The system as described in claim 1, wherein the operations further include increasing a transmission power over the wireless channel along with said reducing the width of the wireless channel.

8. The system as described in claim 1, wherein the operations further include communicating a notification of the reduced width of the wireless channel to a wireless base station through which the wireless data communication is routed.

9. The system as described in claim 1, wherein the operations further include:
ascertaining that the signal activity exceeds a signal activity threshold; and
reducing further the width of the wireless channel within the guard band responsive to ascertaining that the signal activity exceeds the signal activity threshold.

10. The system as described in claim 1, wherein the operations further include:
ascertaining that the signal activity exceeds a signal activity threshold; and
ceasing utilization of the guard band for the wireless data communication responsive to said ascertaining.

11. A computer-implemented method comprising:
identifying a pre-specified portion of radio spectrum that corresponds to a guard band;
utilizing at least a portion of the guard band as a wireless channel for wireless data communication;
detecting data errors in relation to the wireless data communication over the wireless channel;
detecting signal activity in a different wireless channel; and
reducing, by a computing device, a width of the wireless channel within the guard band responsive to ascertaining that the signal activity in the different wireless channel exceeds a signal activity threshold and further responsive to ascertaining that the data errors detected in the wireless channel exceed a data error threshold.

12. The computer-implemented method as described in claim 11, wherein the data error threshold comprises at least one of a packet error rate threshold or a packet error count threshold.

13. The computer-implemented method as described in claim 11, wherein the signal activity is detected further based on detected signal strength of the signal activity in the different wireless channel.

14. The computer-implemented method as described in claim 13, wherein the wireless data communication is implemented via a first antenna, and wherein the signal strength of the signal activity in the different wireless channel is detected via a second antenna.

15. The computer-implemented method as described in claim 11, further comprising increasing, by the computing device, a transmission power over the wireless channel along with said reducing the width of the wireless channel.

16. The computer-implemented method as described in claim 11, further comprising communicating, by the computing device, a notification of the reduced width of the wireless channel to a wireless base station through which the wireless data communication is routed.

17. A computer-implemented method comprising:
identifying a pre-specified portion of radio spectrum that corresponds to a guard band;
specifying, within the pre-specified portion that corresponds to the guard band, a wireless channel portion for wireless data communication and an interference mitigation portion, the interference mitigation portion being usable for mitigating interference between the wireless data communication in the wireless channel portion and signal activity in a different wireless channel that is adjacent to the guard band;
utilizing the wireless channel portion of the guard band as a wireless channel for the wireless data communication;
detecting signal activity in the different wireless channel adjacent to the guard band;
detecting data errors in the wireless data communication over the wireless channel portion of the guard band;
comparing, by a computing device, the data errors to a data error threshold; and
reducing, by the computing device, a width of the wireless channel portion within the guard band responsive to ascertaining that the detected data errors exceed the data error threshold.

18. The computer-implemented method as described in claim 17, wherein the wireless data communication is implemented via a first antenna, and wherein the signal activity is detected via a second antenna.

19. The computer-implemented method as described in claim 17, further comprising increasing a transmission power over the wireless channel.

20. The computer-implemented method as described in claim 17, further comprising, by the computing device and responsive to ascertaining that the signal activity exceeds a signal activity threshold, performing at least one of:
further reducing the width of the wireless channel within the guard band; or
ceasing utilization of the guard band for the wireless data communication.

* * * * *